March 17, 1964 T. A. JEEVES 3,125,676

NOR ELEMENT PARALLEL DYNAMIC ADDER-SUBTRACTOR

Filed Nov. 30, 1961 3 Sheets-Sheet 1

WITNESSES
Leon J. Taza
James T. Young

INVENTOR
Terry A. Jeeves
BY R. J. Brodahl
ATTORNEY

March 17, 1964 T. A. JEEVES 3,125,676

NOR ELEMENT PARALLEL DYNAMIC ADDER-SUBTRACTOR

Filed Nov. 30, 1961 3 Sheets-Sheet 2

United States Patent Office 3,125,676

Patented Mar. 17, 1964

3,125,676

NOR ELEMENT PARALLEL DYNAMIC ADDER-SUBTRACTOR

Terry A. Jeeves, Penn Hills, Pa., assignor to Westinghouse Electric Corporation, East Pittsburgh, Pa., a corporation of Pennsylvania Filed Nov. 30, 1961, Ser. No. 156,025

1 Claim. (Cl. 235—175)

This invention relates to high-speed binary logic circuitry employing a minimized number of NOR circuit elements therein, and more particularly to logic circuitry of the type described capable of either adding or subtracting binary numbers.

As an overall object, the present invention provides a quick acting adder-subtractor which is parallel-operating and can be made in any arbitrary bit size, meaning that the number of bits in the binary numbers fed into the device may be increased or decreased, depending upon the accuracy required for a particular application. Thus, the invention is particularly adapted for use in control applications where two binary numbers $A=(A_1, A_2 \ldots, A_n)$ and $B=(B_1, B_2 \ldots, B_n)$ are employed to produce the result $S=(S_1, T_2 \ldots, S_n)$ which is the binary sum or difference of A and B. By virtue of the fact that the device is parallel acting, all of the result signals $(S_1, S_2 \ldots, S_n)$ are available simultaneously. Furthermore, the device is dynamic, meaning that the result S is available only when the input signals $(A_1, A_2 \ldots, A_n)$ and $(B_1, B_2 \ldots, B_n)$ are present.

Another object of the invention is to provide an adder-subtractor constructed entirely of transistor NOR elements or the like, while requiring a minimum number of NOR elements and having a minimized carry propagation time. As is known, the basic limitation in the speed of transistor logic circuitry is the time required for a carry signal to be propagated through the chain. In a carry propagation circuit of the type described herein, a chain of transistor NOR circuit elements or the like are connected in cascade, while certain ones of the NOR elements will be turned ON while certain others will be turned OFF. The time for a change in the input to appear at the output of the chain is essentially the time required to turn OFF, in sequence, those units in the chain which are ON. This stems from the fact that the transistors used in the NOR elements can be turned ON much more rapidly than they can be turned OFF—a difference in response speed of as much as one hundred. Consequently, in order to increase the speed of the computer, the present invention employs a minimum number of NOR elements in the carry propagation circuitry of the adder-subtractor.

Another object of the invention is to provide an adder-subtractor employing multiple carry signals between stages rather than a single carry signal as in conventional carry circuitry. With this arrangement, the number of required circuit elements is reduced and the speed of operation further increased, however it requires the alternation of carry polarity between stages as well as the alternation of polarity of input signals between stages.

A further object of the invention is to provide an adder-subtractor for binary numbers which may include a NOR power element at the outputs of its stages to produce result signals of high power.

Still another object of the invention is to provide a binary adder-subtractor which is particularly adapted to be constructed with common circuit modules.

In accordance with the invention, hereinafter described in detail, each stage of the adder-subtractor is comprised of six interconnected transistor NOR elements having the following signals applied thereto: an input signal A representing a bit in one binary number, an input signal B representing the corresponding bit in another binary number, and a plurality of carry input signals from the preceding stage. The output of the stage is then the sum signal S and a plurality of carry output signals which, in the embodiments shown herein, may be two or three in number. As will be seen, each stage produces output carry signals which constitute the complements of signals representing the desired output carry digit. These complementary signals could be converted to the correct polarity by passing them through NOR circuit elements, however such a procedure would, of course, slow down the carry propagation time. Consequently, in order to avoid any loss in speed of operation, the complements of the desired digits A and B are fed into the next successive stage to eliminate the necessity for additional NOR elements. In this manner, complementary signals will be fed into every other stage of the chain.

In accordance with another aspect of the invention, if both addition and subtraction are performed, switching circuitry is included to reverse the distribution of signals to alternate stages of the adder-subtractor. The even-numbered stages will supply one-signals at the output and the odd-numbered stages supply zero-signals. Thus, the even stages may conventionally operate normally open relays for output displays, while the odd stages may operate normally closed relays.

The above and other objects and features of the invention will become apparent from the following detailed description taken in connection with the accompanying drawings which form a part of this specification, and in which.

Figure 1:
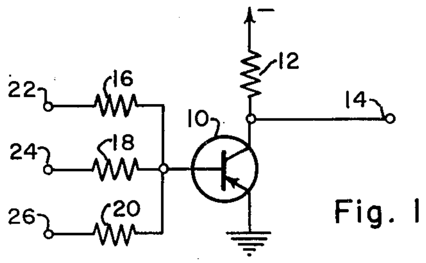
FIGURE 1 is a detailed schematic circuit diagram of a NOR circuit element.

Before considering the specific circuits of the invention, it would be well to consider the binary number system in general. This system uses the radix 2 rather than 10 as in the conventional decimal system. Therefore, it has only two coefficients, namely, 0 and 1.

For example, the number 3 may be written in binary form as follows:

$$3=011$$

which is shorthand for:

$$3=0\times2^2+1\times2^1+1\times2^0=0+2+1$$

Similarly, the numbers 4 and 5 may be written in binary form as follows:

$$4=100$$
$$5=101$$

which is shorthand for:

$$4=1\times2^2+0\times2^1+0\times2^0=4+0+0$$
$$5=1\times2^2+0\times2^1+1\times2^0=4+0+1$$

It can be seen that any binary number may be represented by an appropriate combination of the two binary coefficients, 0 and 1, although it requires many more of these two binary coefficients in appropriate combination to represent a given magnitude than it does to represent the same magnitude using decimal coefficients. The following Table I illustrates the binary representation of the numbers 1 through 10 wherein each variable or "bit X" varies between 0 and 1 only as described above.

TABLE I

*Representation of Binary Numbers*

| | $X_8$ | $X_4$ | $X_2$ | $X_1$ | | $X_8$ | $X_4$ | $X_2$ | $X_1$ |
|---|---|---|---|---|---|---|---|---|---|
| 1 | 0 | 0 | 0 | 1 | 6 | 0 | 1 | 1 | 0 |
| 2 | 0 | 0 | 1 | 0 | 7 | 0 | 1 | 1 | 1 |
| 3 | 0 | 0 | 1 | 1 | 8 | 1 | 0 | 0 | 0 |
| 4 | 0 | 1 | 0 | 0 | 9 | 1 | 0 | 0 | 1 |
| 5 | 0 | 1 | 0 | 1 | 10 | 1 | 0 | 1 | 0 |

It can be seen that each binary number consists of an appropriate combination of "bits" wherein the first bit is $2^0$, the second is $2^1$, the third is $2^2$, the fourth is $2^3$, the *n*th is $2^{n-1}$, and so on.

The rules for addition of two binary numbers A and B to obtain a sum S are as follows:

Let us assume that 7 and 2 are to be added to obtain 9.

$$\begin{aligned}\text{Addend}&=A=7=0111\\ \text{Augend}&=B=2=0010\\ \hline \text{Sum}&=S=9=1001\end{aligned}$$

In performing the foregoing addition, any odd number of 1's in a column is equal to 1 in the corresponding sum column, while an even number of 1's in a column is equal to 0 in the corresponding sum column. However, whenever the arithmetic sum of the 1's in a column is 2 or greater, a carry digit C of 1 must be carried to the next higher column and added to the 1's in that column. Thus, in the example given above, the number of 1's in the second column from the left is 2 so that a carry digit of 1 was carried to the third column from the left and added to the 1 in that column to produce 0 in the sum digit. Therefore, to secure the proper sum digit S in a column, three quantities must be considered: The binary digit A, the binary digit B and the carry digit C from the adjacent lower-ordered column.

In a binary adder, for example, each column of "bits" is added in a stage having three input signals applied thereto. These input signals represent the binary digit A, the binary digit B and the carry input digit C. Furthermore, the output signals will represent the sum digit S and the carry output digit C* which is applied to the next successive or higher-ordered stage of the adder as a carry input digit. Since there are only two binary coefficients, 0 and 1, the input signals may be represented as ON, OFF; plus voltage, minus voltage; pulse, absence of pulse; open relay, closed relay, and so on.

From a consideration of the foregoing rules of addition, it should be apparent that the operation of a binary adder may be represented by the following Table II of possible combinations:

TABLE II

*Possible Combinations of Digits in Binary Adder Stage*

| | Possible Combinations | | | | | | | |
|---|---|---|---|---|---|---|---|---|
| A=Addend Digit | 0 | 1 | 0 | 1 | 0 | 1 | 0 | 1 |
| B=Augend Digit | 0 | 0 | 1 | 1 | 0 | 0 | 1 | 1 |
| C=Carry Input Digit | 0 | 0 | 0 | 0 | 1 | 1 | 1 | 1 |
| S=Sum Digit | 0 | 1 | 1 | 0 | 1 | 0 | 0 | 1 |
| C*=Carry Output Digit | 0 | 0 | 0 | 1 | 0 | 1 | 1 | 1 |

Furthermore, the carry output digit may be expressed as follows:

$$C^* = A\cdot B\cdot \overline{C} + A\cdot \overline{B}\cdot C + \overline{A}\cdot B\cdot C + A\cdot B\cdot C$$

where a digit with a bar over it represents an OFF signal (i.e., a 0 in the foregoing table); a digit without a bar over it represents an ON signal (i.e., a 1 in the foregoing table); + is equivalent to "or"; and · is equivalent to "and." Therefore, stated in other words, the adder will produce a carry output C* whenever there are two or more ON input signals representing the A, B and C digits. This, of course, is evidenced also from the foregoing table.

Conversely, the inverse of the carry output signal $\overline{C}^*$ may be expressed as follows:

$$\overline{C}^* = \overline{A}\cdot \overline{B}\cdot \overline{C} + A\cdot \overline{B}\cdot \overline{C} + \overline{A}\cdot B\cdot \overline{C} + \overline{A}\cdot \overline{B}\cdot C$$

In other words, the inverse of the carry output signal (i.e., no-carry output signal) will be produced whenever there are two or more OFF signals representing the A, B and C digits.

Negative numbers are represented by the ones complement of the corresponding positive number. Thus, −7 is represented as:

$$-7=1000$$

whereas −9 will be represented as:

$$-9=0110$$

With this in mind, the rules for subtraction are the same as those for addition after the negative numbers have been represented in the proper form, except that after the addition process, the last bit in the "sum" must be carried-around and added again. Thus, if 7 is to be subtracted from 9 to obtain 2:

```
A=  9=01001
B=−7=01000 (i.e., the inverse of 0111)
      0001 (i.e., end-around carry)
         1
D=+2= 0010
```

In the foregoing process, as in the case of addition, any odd number of 1's in a column is equal to 1 in the corresponding sum column, while an even number of 1's in a column is equal to 0 in the corresponding sum column. Also, when the arithmetic sum of the 1's in a column is 2 or greater, a carry digit C of 1 must be carried to the next higher column and added to the 1's in that column. Thus, the rules of subtraction are the same as those for addition except that negative numbers are expressed in inverse form, and the end-around carry must be added again to whatever would otherwise be the sum in addition. This end-around carry always constitutes the last bit on the left-hand end of the "sum" obtained by adding the positive and negative numbers.

As will be seen, the circuitry shown and described hereinafter comprises means for electrically adding and subtracting binary numbers wherein the input digits A, B and C are represented by ON or OFF binary signals which correspond to the 1 and 0 binary coefficients, respectively.

Referring now to FIG. 1, a typical NOR circuit element is shown and includes a PNP junction transistor 10 having its emitter grounded and its collector connected through resistor 12 to a source of negative voltage, not shown, the arrangement being such that when the transistor 10 is cut off, a high negative voltage will appear on output lead 14. When the transistor conducts, however, it will act as a closed switch so that the output lead will be essentially at ground potential. Connected to the base of transistor 10 are three input leads each having a resistor 16, 18 or 20 therein. The circuit is such that the transistor will normally be cut off, whereby a high negative voltage will appear on output lead 14. When, however, a negative input signal is applied to any one of the input terminals 22, 24 or 26, transistor 10 will be driven to saturation so that the voltage on output lead 14 rises until it assumes ground potential. Furthermore, the transistor 10 will conduct to raise the voltage on output lead 14 regardless of whether one, two or three negative input signals are applied to the terminals 22, 24 and 26. When the transistor 10 is cut off and a high negative voltage appears on lead 14, the NOR circuit is said to be "ON"; whereas, whenever a negative input signal is applied to any one of the leads 22–26 and the transistor 10 conducts to lower the voltage on output lead 14, the NOR circuit element is said to be "OFF." From a consideration of the circuit, it will be seen that the illustration of three input terminals is for purposes of explanation only, it being understood that the number of input terminals will depend upon the number of input signals and may extend from one up to any practical number.

When two NOR circuit elements such as that in FIG. 1 are connected in cascade such that the output lead 14 of one circuit is connected to one of the terminals 22–26 of a succeeding circuit, it can be seen that if the first NOR element is ON then the second or succeeding NOR element must be OFF. In like manner, when the first NOR element is OFF then the second NOR element will be ON, assuming that there are only two NOR elements involved. If, however, three NOR elements are connected to the respective input terminals 22, 24, and 26 of the circuit of FIG. 1, then the circuit will be switched from an ON condition, to an OFF condition whenever any one of the three NOR elements connected to the terminals 22, 24 and 26 is ON so that a negative voltage is applied to its associated terminal.

In the claim which follows this specification, the terminals 22, 24 and 26 are collectively referred to as the "input" to a NOR element; whereas, lead 14 is referred to as the "output." Therefore, whenever one or more signals are "applied to the input" of the NOR element, they may be applied to any one of the terminals 22–26 or, for that matter, to any number of input terminals.

As was mentioned above, in adding or subtracting binary numbers electrically, a plurality of transistor NOR element stages or the like are connected in cascade. Each of the stages has two input terminals to which are applied corresponding bits of the binary numbers to be added or subtracted. Thus, signals representing $2^0$ bits of the binary numbers to be added or subtracted are applied to the first stage, signals representing the $2^1$ bits of the binary numbers to be added or subtracted are applied to the second stage, signals representing the $2^2$ bits of the binary numbers are applied to the third stage, and so on. Furthermore, a 1 bit is represented by an ON or negative signal whereas a 0 bit is represented by an OFF or less positive signal (i.e., ground potential). At the output of each stage in a parallel adder there will appear a sum signal which may be ON or OFF, depending upon whether the sum bit should be a 1 or a 0. The stages are interconnected by carry signals which represent the carry digits mentioned above in connection with the rules for addition and subtraction.

Figure 2:
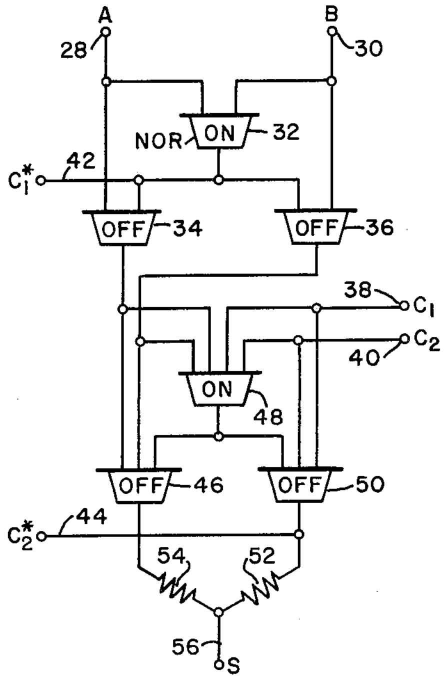
FIG. 2 is a block schematic circuit diagram of one embodiment of a stage in the adder-subtractor of the invention employing two carry signals.

A stage for such a parallel adder is shown in FIG. 2 wherein the input terminals are designated by the numerals 28 and 30. The normal states of the transistor NOR elements are as indicated in the drawing. Thus, NOR element 32 will be normally ON since, in the absence of input signals to the stage, it will have two OFF signals applied to terminals 28 and 30. The signal on terminal 28 as well as the output of NOR element 32 are applied to NOR element 34 which is normally OFF since it has the output of normally ON element 32 applied thereto. In a similar manner, NOR element 36 has the output of NOR element 32 and the signal on terminal 30 applied thereto, and is normally OFF since it is connected to the normally ON element 32.

In the particular embodiment of FIG. 2, two carry input signals are applied to terminals 38 and 40 while two output carry signals appear on terminals 42 and 44. The input signals to the stage are designated as A and B; the two input carry signals on terminals 38 and 40 are designated as $C_1$ and $C_2$; and the two output carry signals on terminals 42 and 44 are designated as $C_1$* and $C_4$*.

The outputs of NOR elements 34 and 36 are applied to NOR element 46 as well as NOR element 48. The input carry signals $C_1$ and $C_2$ are applied to the input of element 48 as well as the input to element 50. Also applied to the inputs of elements 46 and 50 is the output of the NOR element 48. The outputs of NOR elements 46 and 50 are interconnected by series resistors 52 and 54, and the sum signal S for the stage appears on terminal 56 at the juncture of these two resistors. Under normal conditions with no carry input, both $C_1$ and $C_2$ are OFF. Under these circumstances, the NOR element 48 will be ON since the NOR elements 34 and 36 leading into it are also OFF. The NOR elements 46 and 50, however, will be OFF since they have the output of ON element 48 applied thereto. It will be noted that while both of the carry input signals $C_1$ and $C_2$ are OFF, the carry output signal $C_1$* is ON; whereas the carry output signal $C_2$* is OFF.

If one of the binary signals applied to terminals 28 and 30 is ON while the other is OFF and no carry input signal is applied to the stage, then an ON sum signal should appear at terminal 56, and there should be an absence of a carry output signal from the stage in accordance with the rules of addition and subtraction outlined above. Thus, if the signal on terminal 28, is ON, for example, NOR element 32 will be switched OFF. Under these circumstances, NOR element 36 will now be switched ON since it has two OFF signals applied to its input. The NOR element 34, however, will remain OFF since terminal 28 leading to its input has an ON signal applied thereto. With NOR element 36 ON, NOR element 48 will switch OFF, thereby switching NOR element 50 ON since it now has three OFF signals applied to its input. Thus, with NOR element 50 ON, an ON sum signal S will appear at terminal 56. In addition, the signal representing $C_1$* on terminal 42 will be OFF while the signal on terminal 44 representing $C_2$* will be ON, denoting that a carry output signal has not been generated by the stage.

If it is assumed that the signals applied to terminals 28 and 30 are both ON and that there is an absence of a carry input signal, then an OFF sum signal S should appear at terminal 56 and a carry output signal should be minals 42 and 44 should both be OFF. Under the circumstances 42 and 44 should both be OFF. Under the cumstances just described, the signal on terminal 42 will switch from an ON condition to an OFF condition since NOR element 32 is now switched OFF by the ON signals applied to terminals 28 and 30. The NOR elements 34 and 36, however, remain OFF since each has an ON signal applied thereto through terminals 28 and 30, respectively. Consequently, since there is an absence of an input carry signal to the stage, the remaining NOR elements 46, 48 and 50 remain in the states shown so that there is an OFF sum signal S on terminal 56. Since the signal $C_1$* on terminal 42 is now OFF, and since the signal $C_2$* on terminal 54 remains OFF, both of the output signals are OFF indicating an output carry digit.

Similarly, if an input carry digit is applied to the stage and one ON signal is applied to terminals 28 and 30, an output carry should be generated, but the sum digit S should be zero, meaning that an OFF signal should appear on terminal 56. Let us assume, for example, that the signal applied to terminal 28 is ON. Under these circumstances, NOR element 32 will switch OFF while NOR element 36 will switch ON. Since, however, an input carry is applied to the stage, one of the signals applied to terminal 38 or 40 is ON, meaning that NOR element 48 will switch OFF. However, NOR element 50 will remain OFF since it has an ON signal applied to its input from terminal 38 or 40. Consequently, two OFF signals will again appear at terminals 42 and 44 representing the output carry digits $C_1$* and $C_2$*, while an OFF signal will appear at terminal 56 representing the sum digit S.

If ON signals are applied to both of terminals 28 and 30 and an input carry is applied to the stage, then an output carry should be generated, and an ON sum signal S should appear on terminal 56. Under these conditions, NOR element 32 will switch OFF, however NOR elements 34 and 36 will remain OFF since they both have an ON signal applied thereto through terminals 28 and 30, respectively. In addition, NOR element 48 will switch OFF since it now has an ON signal applied thereto through terminal 38 or 40, and NOR element 50 will remain OFF since it also has an ON signal applied to its input from terminal 38 or 40. The NOR element 46, however, now has all OFF signals applied to its input so that it switches ON to produce the desired ON sum signal S at terminal 56. At the same time, the signals on both of terminals 42 and 44 are OFF to produce the desired output carry digit. The action of the stage shown in FIG. 2 can be further understood by studying the following Table III.

TABLE III

| Inputs | | | | | NOR Elements | | | | | | Outputs | | | | Carry Output Plus Sum of A and B | |
|---|---|---|---|---|---|---|---|---|---|---|---|---|---|---|---|---|
| A | B | $C_1$ | $C_2$ | C | 32 | 34 | 36 | 48 | 46 | 50 | $\overline{C}_1$* | $\overline{C}_2$* | $\overline{C}$* | S | C* | S |
| 0 | 0 | 0 | 0 | 0 | 1 | 0 | 0 | 1 | 0 | 0 | 1 | 0 | 1 | 0 | 0 | 0 |
| 1 | 0 | 0 | 0 | 0 | 0 | 0 | 1 | 0 | 0 | 1 | 0 | 1 | 1 | 1 | 0 | 1 |
| 0 | 1 | 0 | 0 | 0 | 0 | 1 | 0 | 0 | 0 | 1 | 0 | 1 | 1 | 1 | 0 | 1 |
| 1 | 1 | 0 | 0 | 0 | 0 | 0 | 0 | 1 | 0 | 0 | 0 | 0 | 0 | 0 | 1 | 0 |
| 0 | 0 | 1 | 0 | 1 | 1 | 0 | 0 | 0 | 1 | 0 | 1 | 0 | 1 | 1 | 0 | 1 |
| 1 | 0 | 0 | 1 | 1 | 0 | 0 | 1 | 0 | 0 | 0 | 0 | 0 | 0 | 0 | 1 | 0 |
| 0 | 1 | 0 | 1 | 1 | 0 | 1 | 0 | 0 | 0 | 0 | 0 | 0 | 0 | 0 | 1 | 0 |
| 1 | 1 | 0 | 1 | 1 | 0 | 0 | 0 | 0 | 1 | 0 | 0 | 0 | 0 | 1 | 1 | 1 |

It will be noted from the foregoing table that the carry input signals $C_1$ and $C_2$ act in concert and that the carry input digit C is the binary sum of the two input signals $C_1$ and $C_2$. Stated in other words, a carry input digit is generated to the stage only when the input carry signals $C_1$ and $C_2$ are of different binary states. Similarly, the output carry signals $\overline{C}_1$* and $\overline{C}_2$* act in concert, however, their binary sum produces the complement $\overline{C}$* of the carry output digit C*. That is, when each of the inputs A, B and C is zero, there should be an absence of a carry output digit C*. However, the binary sum of $\overline{C}_1$* and $\overline{C}_2$* is 1. Similarly, if both A and B are 1 while C is 0, a carry output digit C* of 1 should be generated; however, it will be noted that the binary sum of $\overline{C}_1$* and $\overline{C}_2$* under these conditions is zero. Consequently, the stage shown in FIG. 2 produces the sum digit S and a pair of signals $\overline{C}_1$* and $\overline{C}_2$* which together constitute the complement of the carry digit C*.

The usefulness of the stage shown in FIG. 2 is further illustrated by its action when supplied with complement signals at the inputs A, B, $C_1$ and $C_2$. This is illustrated in the following Table IV.

TABLE IV

| Inputs | | | | | NOR Elements | | | | | | Outputs | | | | Carry Output Plus Sum of A+B | |
|---|---|---|---|---|---|---|---|---|---|---|---|---|---|---|---|---|
| $\overline{A}$ | $\overline{B}$ | $\overline{C}_1$ | $\overline{C}_2$ | $\overline{C}$ | 32 | 34 | 36 | 48 | 46 | 50 | $C_1$* | $C_2$* | C* | $\overline{S}$ | C* | S |
| 1 | 1 | 1 | 0 | 1 | 0 | 0 | 0 | 0 | 1 | 0 | 0 | 0 | 0 | 1 | 0 | 0 |
| 0 | 1 | 0 | 1 | 1 | 0 | 1 | 0 | 0 | 0 | 0 | 0 | 0 | 0 | 0 | 0 | 1 |
| 1 | 0 | 0 | 1 | 1 | 0 | 0 | 1 | 0 | 0 | 0 | 0 | 0 | 0 | 0 | 0 | 1 |
| 0 | 0 | 0 | 1 | 1 | 1 | 0 | 0 | 0 | 1 | 0 | 1 | 0 | 1 | 1 | 1 | 0 |
| 1 | 1 | 0 | 0 | 0 | 0 | 0 | 0 | 1 | 0 | 0 | 0 | 0 | 0 | 0 | 0 | 1 |
| 0 | 1 | 0 | 0 | 0 | 0 | 1 | 0 | 0 | 0 | 1 | 0 | 1 | 1 | 1 | 1 | 0 |
| 1 | 0 | 0 | 0 | 0 | 0 | 0 | 1 | 0 | 0 | 1 | 0 | 1 | 1 | 1 | 1 | 0 |
| 0 | 0 | 0 | 0 | 0 | 1 | 0 | 0 | 1 | 0 | 0 | 1 | 0 | 1 | 0 | 1 | 0 |

From this table, it can be seen that when the complements of the input digits A, B and C are applied to the stage, the complement $\overline{S}$ of the sum digit appears at terminal 56 while the proper carry digit C is formed by $C_1$* and $C_2$* acting in concert.

From the foregoing discussion, it can be seen that an adder, for example, may be constructed from stages such as that shown in FIG. 2 by using either binary signals representing the input digits A, B and C or the complements of those signals. However, the adder cannot be constructed by merely connecting the output of one stage to the input of the succeeding stage since the carry output signals $C_1$* and $C_2$* will be inverted in polarity from that required for the next successive stage. A parallel array of stages such as that shown in FIG. 2 could conventionally be obtained by passing the output carry signals $C_1$* and $C_2$* from each stage through additional NOR circuit elements so as to reverse the polarity and obtain a carry signal of the proper phase. This procedure, however, would increase the carry propagation time since the carry propagation signal, in passing through the chain of stages, would have to pass through additional NOR elements which might have to be turned OFF.

In accordance with the present invention, the need of additional NOR circuit elements to reverse the polarities of the output carry signals $C_1$* and $C_2$* is eliminated by operating every other one of the stages in the adder chain in accordance with Table III while operating the remaining ones of the stages in accordance with Table IV. Thus, the first stage in the chain may operate in accordance with Table III, the second in accordance with Table IV, the third in accordance with Table III, the fourth in accordance with Table IV, and so on. Furthermore, by providing an appropriate switching circuit at the inputs to the stages, the chain of stages may be alternatively used for either addition or subtraction.

An adder-subtractor of the type described above is illustrated in FIG. 3 and comprises two stages 58 and 60. Since these stages are identical in construction to the stage shown in FIG. 2, elements in FIG. 3 which correspond to elements shown in FIG. 2 are identified by like reference numerals. Terminal 28 in each of the stages 58 and 60 is connected to NOR elements 32 and 34 in the same manner as shown in FIG. 2. However, the terminal 30 of FIG. 2 is replaced in stages 58 and 60 of FIG. 3 by two terminals 30*a* and 30*b*. Terminal 30*a* is connected to the input of NOR element 62 in each stage; whereas terminal 30*b* is connected to the input of NOR element 64 for each stage. Furthermore, the NOR elements 62 for each stage have their inputs connected to a subtract bus 66; whereas the NOR elements 64 have their inputs all connected to an add bus 68. In order to add the binary numbers, the add bus 68 will be energized whereby an ON signal will be applied to the NOR elements 64 in each stage 58 and 60. Therefore, these elements are turned OFF so that the signal at the outputs of the elements will not affect the operation of the stages. Similarly, in order to subtract two binary numbers, the subtract bus 66 is energized to apply an ON signal to elements 62 so that they can not affect the operation of the stages in response to input signals.

Let us assume, for example, that we are adding the numbers 3 and 2 to obtain 5. Those numbers may be represented as follows in accordance with the foregoing discussion of the representation of binary numbers:

$$A=3=\begin{matrix} A_2 & A_1 \\ 1 & 1 \end{matrix}$$

$$B=2=\begin{matrix} B_2 & B_1 \\ 1 & 0 \end{matrix}$$

It is seen that the number 3 is represented by the binary digit $A_1$ and the binary digit $A_2$, both of which are 1 or ON. In like manner, the number 2 is represented by the binary digit $B_1$ which is 0 or OFF and the binary digit $B_2$ which is 1 or ON. Referring again to FIG. 3, a binary signal representing the binary digit $A_1$ is applied to terminal 28 of stage 58. Consequently, the signal applied to this terminal will be ON. In stage 60, however, the complement of the binary signal representing the bit $A_2$ is applied to terminal 28. Consequently, an OFF signal will be applied to terminal 28 in stage 60. In stage 58, a binary signal representing the bit $B_1$ is applied to terminal 30*b* while the complement of that binary signal is applied to terminal 30*a*. Thus, since the bit $B_1$ is 0, an OFF signal will be applied to terminal 30*b* while an ON signal will be applied to terminal 30*a*. In stage 60, a binary signal representing the bit $B_2$ is applied to terminal 30*a*, while the complement of that binary signal is applied to terminal 30*b*. Therefore, since the bit $B_2$ is 1, an ON signal will be applied to terminal 30*a*, while an OFF signal will be applied to terminal 30*b*. Since we are now adding the two numbers A and B, the add bus 68 will be energized to apply an ON signal to the NOR elements 64 in each stage 58 and 60 whereby the elements will be switched OFF and will not effect the operation of NOR elements 32 and 36 regardless of the binary state of the signals applied to terminals 30*b* in each stage. Consequently, only those signals applied to terminals 30*a* in each stage can affect the operation of the system.

Referring now, specifically, to stage 58, the complement of the binary signal representing the bit $B_1$ is applied to the input of NOR element 62. This NOR element (i.e., element 62) is normally ON so that when the complement of the binary signal representing the bit $B_1$ is applied to its input, it is switched OFF since the complement of the bit $B_1$ will be ON for the example given above. In this manner, an OFF signal will appear at the output of NOR element 62; and this signal, in combination with the ON signal applied to terminal 28, comprises the correct combination of signals to be applied to the input of stage 58.

In the next stage 60, however, the complements of the binary signals representing the bits $A_2$ and $B_2$ should be applied to the input of the stage. The complement of $A_2$ is already applied to terminal 28; and since $B_2$, which is ON, is passed through NOR element 60, the NOR element is turned OFF so that two OFF signals are applied to the input of stage 60. From the foregoing representation of the two binary numbers, it will be seen that this is the correct signal input for stage 60.

Thus, with the add bus 68 energized, the binary signals representing the bits $A_1$ and $B_1$ will be applied to the input of stage 58, while the complements of the binary signals representing the bits $A_2$ and $B_2$ will be applied to the input of stage 60. In the next or third stage following stage 60, the signals would be applied as they are in stage 58; and in the fourth stage, the complements of the signals would be applied as in stage 60. Consequently, the polarities of the signals applied to alternate stages in the chain will be reversed; and, in addition, the polarities of the output signals will also be reversed. That is, the sum signal S on terminal 56 in stage 58 will be the binary signal representing the proper sum digit, while the binary signal $\overline{S}$ appearing on terminal 56 in stage 60 will be the complement of the binary signal representing the proper sum digit. Stage 58 would conventionally operate a normally open relay for output display, while stage 60 would operate a normally closed relay. That is, when there is an absence of a sum signal from stage 58, the signal on terminal 56 will be 0 or OFF; while when there is an absence of a sum signal from stage 60, the signal on terminal 56 in that stage will be 1 or ON. Furthermore, as was mentioned above, an output carry digit will be generated by stage 58 when the carry signals $\overline{C}_1$* and $\overline{C}_2$* are of the same binary state; whereas an output carry digit will be generated by stage 60 when the signals $C_1$ and $C_2$ are of different binary states.

Figure 3:
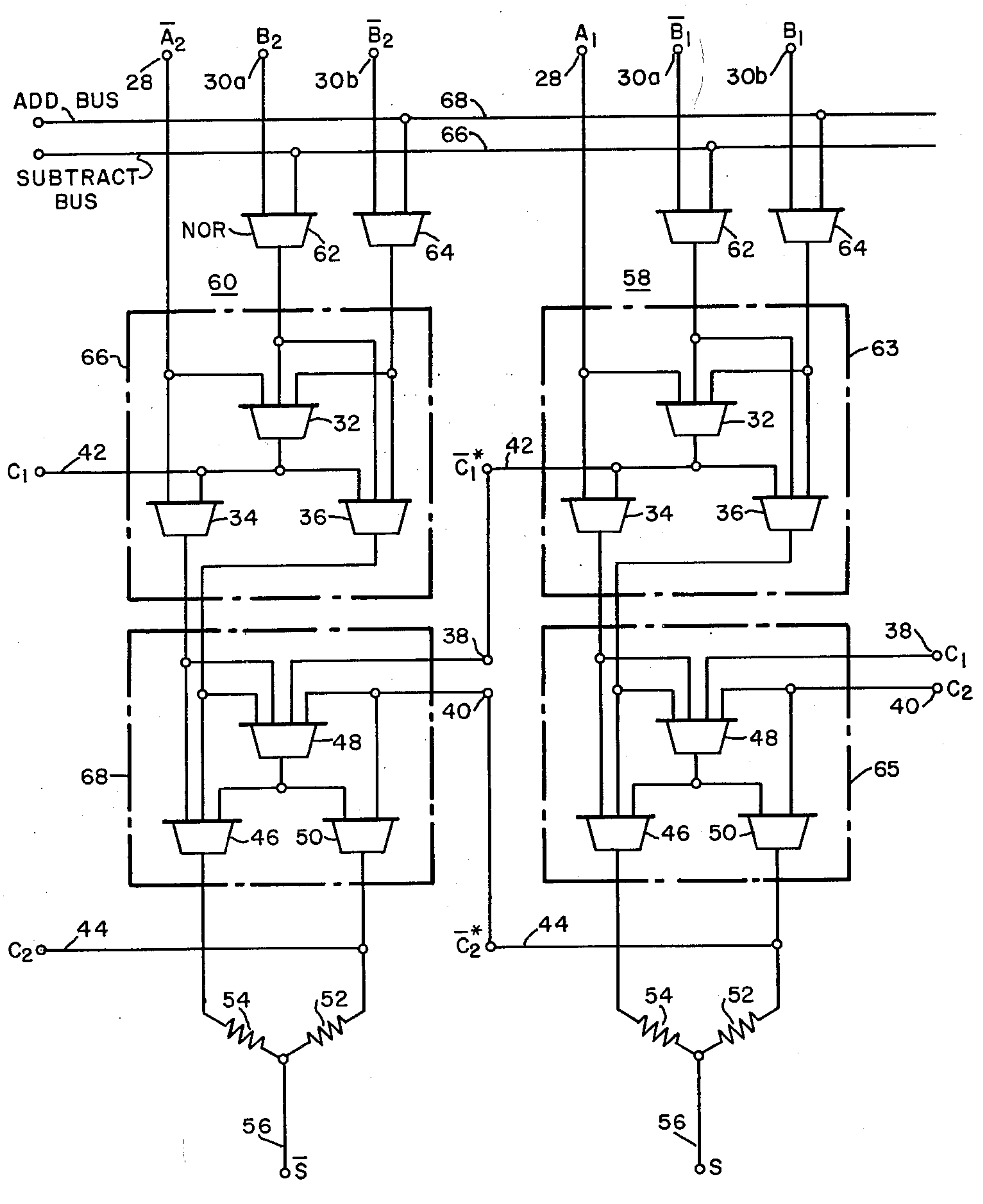
FIG. 3 is a block schematic circuit diagram of two stages of an adder-subtractor illustrating the switching circuitry used to reverse the distribution of signals to alternate stages.

Now, let us assume that we wish to subtract the numbers 3 and 2 with the circuit of FIG. 3. Such subtraction may be represented in accordance with the foregoing rules of subtraction as follows:

$$
\begin{array}{rcc}
 & A_2 & A_1 \\
A=+3= & 1 & 1 \\
 & B_2 & B_1 \\
B=-2= & 0 & 1 \\
\hline
 & 0 & 0 \\
 & & 1 \\
\hline
S=+1= & 0 & 1
\end{array}
$$

It can be seen that in this case −2 is represented by the binary signals which are the complements of those signals representing +2. In order to subtract the two numbers, the subtract bus 66 is energized whereby the NOR elements 62 in each stage 58 and 60 will be switched OFF, thereby rendering these NOR elements ineffective to alter the operation of the stages. In stage 58, the complement of the binary signal representing the binary bit $B_1$ for +2 should be applied to the input. Thus, by applying a 0 or OFF signal to terminal 30*b*, the NOR element 64 will remain ON to apply an ON or 1 signal to the input of stage 58, this being the correct binary state for subtraction. The signal representing the bit $A_1$, however, is not inverted since it represents a positive number. In stage 60, the polarity of the input signals must be reversed so that, although the bit $B_2$ should be 0 or OFF for −2, a 1 or ON signal must be applied to stage 60 to effect the desired result. Remembering that the digit $B_2$ for the number 2 is 1 or ON, the inverse of that signal be applied to terminal 30*b* will be 0 or OFF, meaning that NOR element 64 will produce a 1 or ON signal to the input of stage 60, this being the complement of the desired binary signal for −2. With terminal 28 in stage 60, however, the complement of the bit $A_2$ is applied directly to the input of the stage, and this is the correct binary signal, as will be understood.

Thus, the input signals to the stages 58 and 60 will be of the same binary states, regardless of whether or not addition or subtraction is being performed. In order to add, the add bus 68 is energized; whereas, in order to subtract, the subtract bus 66 is energized. For a complete adder-subtractor using ones complements, the carry signals from the left-most stage in the chain must be fed back into the right-most stage. This is necessary since, remembering the rules for subtraction, an end-around carry signal must be applied from the last stage in the chain to the first stage and again propagated through the chain. Consequently, for the end-around carry with an even number of stages, the output carry signals from the left-most stage will be connected directly to the carry inputs of the right-most stage; and for end-around carry with an odd number of stages, the output carry signals from the left-most stage will have to be connected through NOR elements to the carry inputs of the right-most stage. In this manner, the alternation of carry signal polarity between the odd and even stages is properly compensated for correct end-around carry. That is, if there are an even number of stages in the chain as in FIG. 3, the output carry signals $C_1$ and $C_2$ will be of the correct polarity to be fed back into the input of stage 58. If there are an odd number of stages, however, the output carry signals from the last stage will be $\overline{C}_1$ and $\overline{C}_2$ so that these signals will have to be inverted in polarity before being applied to the input of the first stage.

Figure 4:
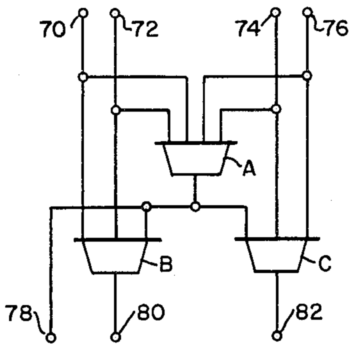
FIG. 4 is an illustration of a circuit module which may be used to construct the circuits of FIGS. 2 and 3.

It can be seen that the circuit portions 63 and 65 of stage 58, enclosed by broken lines, comprise common circuit modules. Similarly, the circuit portions 66 and 68 of stage 60 comprise identical common circuit modules. Such a circuit module is shown in FIG. 4 and includes three NOR elements A, B and C. The module has four input terminals 70, 72, 74 and 76 and three output terminals 78, 80 and 82. In FIG. 3, for example, the NOR elements 32 correspond to element A shown in FIG. 4, the elements 34 correspond to element B of FIG. 4 and the elements 36 correspond to element C of FIG. 4. For the portions 63 and 66 shown in FIG. 3, only one of the two input terminals 70 and 72 will be used. One of these terminals will then correspond to terminal 28 shown in FIG. 3. The terminals 74 and 76 would be connected to the outputs of NOR elements 62 and 64. Terminal 78 of FIG. 4 would correspond to terminal 42 of FIG. 3, and terminals 80 and 82 would comprise the outputs of NOR elements 34 and 36 which would be connected to the input terminals 70 and 72 of a circuit module comprising the portion 65 or 68 of FIG. 3. In addition, in portions 65 and 68, the terminals 74 and 76 would correspond to terminals 38 and 40 of FIG. 3, and terminal 82 would correspond to terminal 44. The terminal 78 of the module shown in FIG. 4, however, would not be used for the portions 65 and 68 of FIG. 3. Thus, the adder-subtractor shown herein is particularly adapted for modular construction which greatly simplifies the circuitry involved while reducing its cost.

Figure 5:
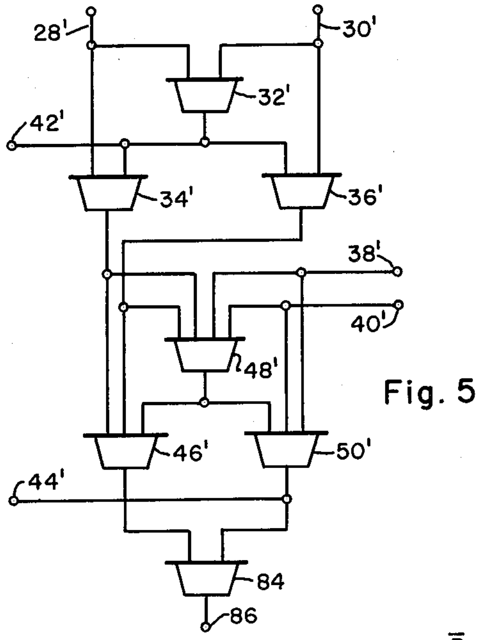
FIG. 5 is a block schematic circuit diagram of another embodiment of a stage for the invention incorporating a power NOR element at its output.

In FIG. 5 a stage of an adder-subtractor similar to that of FIG. 2 is shown wherein corresponding elements are identified by like primed reference numerals. In the case of FIG. 5, however, the outputs of NOR elements 46′ and 50′ are connected to the input of a power NOR element 84, the output of which appears as the complement of the desired sum signal on terminal 86. The power NOR element 84 may be used to drive special output devices or, alternatively, both of the NOR elements 46′ and 50′ could be replaced by power NOR element and the resistor network 52, 54 of FIG. 2 retained.

Figure 6:
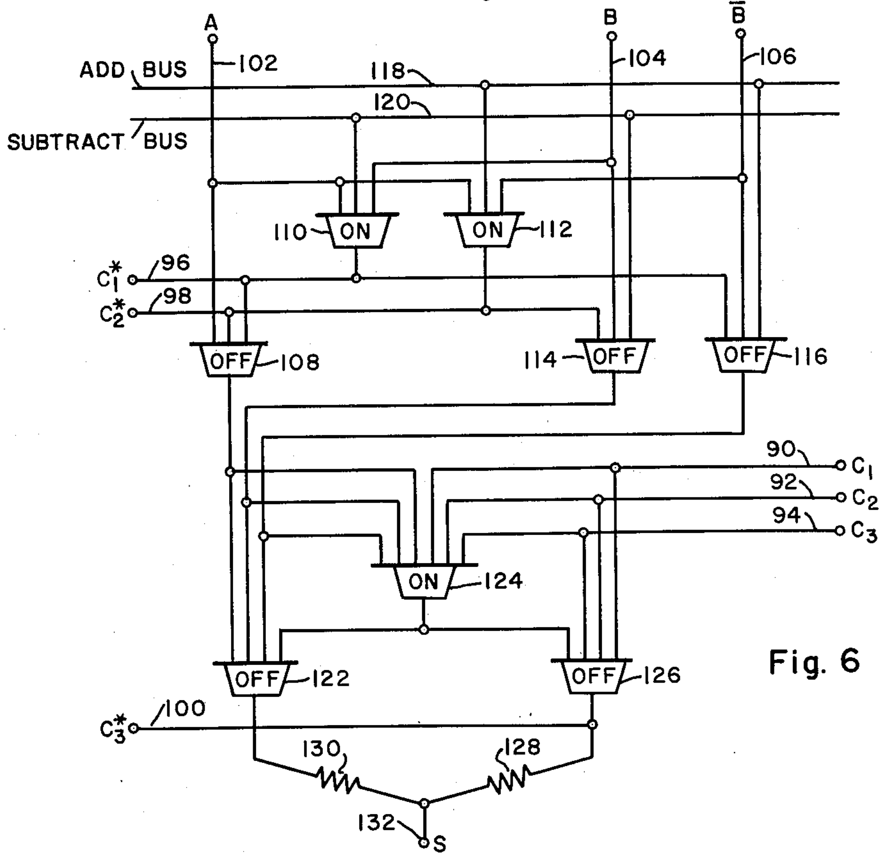
FIG. 6 illustrates still another embodiment of a stage for the adder-subtractor of the present invention employing three carry signals.

Referring now to FIG. 6, another embodiment of the invention is shown comprising a stage for an adder-subtractor which has a faster overall response than the circuits of FIGS. 2, 3 and 5, but is not as well suited to modular construction. In this embodiment, three separate carry input signals $C_1$, $C_2$ and $C_3$ are applied to terminals 90, 92 and 94; while three separate output carry signals $C_1^*$, $C_2^*$ and $C_3^*$ appears on output terminals 96, 98 and 100, respectively. Furthermore, a carry input digit is applied to the stage of FIG. 6 when one of the carry input signals $C_1$, $C_2$ or $C_3$ is of one binary state while the other two are of the other binary state; while an output carry digit is generated by the stage when all of the output carry signals $C_1^*$, $C_2^*$ and $C_3^*$ are of the same binary state. That is, when there is an absence of an output carry from the stage, one of the signals appearing on leads 96, 98 or 100 will be OFF while the other two will be ON. Conversely, when an output carry is generated by the stage, all of the output carry signals will be OFF.

Input signals representing bits in binary numbers are applied to terminals 102, 104 and 106. The binary signal representing a bit in a first binary number is applied to terminal 102, the binary signal representing a bit in another binary number is applied to terminal 104, and the complement of the latter-mentioned binary signal is applied to terminal 106. The signal on terminal 102 is applied to each of three NOR circuit elements 108, 110 and 112; the binary signal on terminal 104 is applied to NOR element 110 as well as NOR element 114; and the binary signal on terminal 106 is applied to NOR element 112 as well as NOR element 116. As was the case with the embodiment of FIG. 3, an add bus 118 is provided as well as a subtract bus 120. The add bus is connected to NOR elements 112 and 116; whereas the subtract bus is connected to elements 110 and 114.

The outputs of NOR elements 108, 114 and 116 are each connected to NOR element 122 as well as NOR element 124. The carry input signals on terminals 90, 92 and 94 are all applied to NOR element 124 as well as the final NOR element 126. As was the case with the embodiment of FIG. 2, the outputs of NOR elements 122 and 126 are interconnected by series resistors 128 and 130, and a binary signal representing the sum bit will appear at terminal 132. Alternatively, the resistors 128 and 130 could be replaced by a power NOR element such as element 84 in FIG. 5, or the elements 122 and 126 could comprise power NOR elements if desired. The output carry signals $C_1^*$, $C_2^*$, and $C_3^*$ appear at the outputs of NOR elements 110, 112 and 126.

The normal states of the NOR elements are as shown in FIG. 6. Consequently, terminals 96 and 98 will normally have ON signals applied thereto; whereas terminal 100 will normally have an OFF signal applied thereto, indicating the absence of a carry output. If it is assumed that we are adding two binary bits, A is equal to 1 and B is equal to 0, with no carry input, then an ON sum signal should appear at terminal 132 and one of the signals on terminals 96–100 should be of one binary state while the other two are of the opposite binary states, indicating the absence of a carry output signal. Since we are now adding, the add bus 118 is energized to switch OF normally ON NOR element 112. Furthermore, since the bit A equals 1, the signal applied to terminal 102 will be ON, thereby switching OFF NOR element 110. NOR element 108, however, will remain OFF since it has an ON signal applied thereto from terminal 102. However, since the NOR element 112 is now OFF, the signal applied to terminal 104 is OFF and the subtract bus 120 is deenergized, the NOR element 114 will switch from an OFF condition to an ON condition. NOR element 116 will remain OFF since it has an ON signal applied thereto from add bus 118 as well as on ON signal on terminal 106 which is the complement of the last signal on terminal 104. Thus, with element 114 ON, element 124 is switched OFF to switch ON element 126. Element 122, however, remains OFF since it has an ON signal applied thereto from element 114. Consequently, an ON sum signal appears at terminal 132; and, although the signals of terminals 96 and 98 are now both OFF, the signal on terminal 100 is ON indicating that no output carry was generated.

If, however, both of the A and B bit signals are ON for an adding process, indicating that two ones are to be added, all of the NOR elements 108, 114 and 116 will remain OFF since they all have at least one ON signal applied to their inputs. Consequently, the states of NOR elements 122, 124 and 126 will also remain unchanged. Since NOR elements 110 and 112 are now OFF as well as NOR element 126, three OFF signals appear at output terminals 96, 98 and 100, indicating that an output carry was generated.

If both of the A and B signals are ON and an input carry is applied to the stage, meaning that one of the signals on leads 90, 92 and 94 is ON, then the states of NOR elements 108, 114 and 116 will remain unchanged; however, NOR element 124 will be switched OFF by the ON signal on one of the leads 90, 92 or 94. At the same time, NOR element 126 will remain OFF due to the input carry ON signal. The NOR element 122, however, now has all OFF signals applied to its input so that it switches ON to produce an ON sum signal at lead 132. At the same time, since each of the NOR elements 110, 112 and 126 is OFF, three OFF signals appear at terminals 96, 98 and 100 to indicate an output carry digit.

As was the case with the embodiment of FIG. 3, when two or more stages such as that shown in FIG. 6 are connected in cascade, the polarities of the input signals to terminals 102, 104 and 106 must be reversed in every other stage due to the fact that a carry output from one stage is the complement of the required carry input for the next succeeding stage. In order to subtract the two binary numbers A and B, the subtract bus is energized whereby the NOR element 110 will remain OFF. The operation of the circuit is then the same as that for addition outlined above except that the ones complement of the B bit is applied to the circuit to effect the addition process.

Although the invention has been shown in connection with certain specific embodiments, it will be readily apparent to those skilled in the art that various changes in form and arrangement of parts may be made to suit requirements without departing from the spirit and scope of the invention.

I claim as my invention:

In a stage for a NOR element adder-subtractor responsive to a first input binary signal representing a bit in a binary number, a second input binary signal representing a bit in another binary number, and three input carry signals which may be of the same or different binary states, the combination of first and second normally ON NOR circuit elements, means for applying said first and second binary input signals to the first NOR element, means for applying the first binary input signal and the complement of the second binary input signal to the second NOR element, a third normally OFF NOR circuit element, means for applying said first binary input signal and the outputs of said first and second NOR elements to the third NOR element, fourth and fifth normally OFF NOR circuit elements, means for applying said second binary input signal and the output of the second NOR element to the fourth NOR element, means for applying the complement of the second binary input signal and the output of the first NOR element to the fifth NOR element, a sixth normally ON NOR circuit element, means for applying the outputs of said third, fourth and fifth NOR elements as well as said carry input signals to the sixth NOR element, a seventh normally OFF NOR circuit element having the outputs of said third, fourth, fifth and sixth NOR elements applied thereto, an eighth normally OFF NOR circuit element having said three carry input signals as well as the output of the sixth NOR element applied thereto, a pair of impedance elements connected in series between the outputs of said seventh and eighth NOR circuit elements whereby an output binary signal representing a sum bit will be derived at the juncture of said impedance elements, means for applying an ON signal to the inputs of said second and fifth NOR elements whereby they will be switched OFF regardless of the condition of said input binary signals applied thereto when it is desired to add two binary numbers, means for applying an ON binary signal to the inputs of said first and fourth NOR elements whereby they will be switched OFF regardless of the condition of said input binary signals applied thereto when it is desired to subtract two binary numbers, and means for deriving three output carry signals from the outputs of said first, second and eighth NOR circuit elements.

References Cited in the file of this patent

Richards: Arithmetic Operations in Digital Computers, D. Van Nostrand, 1955, pages 89 to 93, 118 to 128.

Boswell: "Nor Logic," Instruments and Control Systems, September 1960, pages 1523 to 1525.